No. 675,134. Patented May 28, 1901.
C. W. MANNOOCH.
MONKEY WRENCH.
(Application filed Apr. 3, 1901.)
(No Model.)

Witnesses
F. G. Campbell
H. H. Riley

C. W. Mannooch, Inventor
By C. A. Snow & Co.
Attorneys

UNITED STATES PATENT OFFICE.

CHARLES W. MANNOOCH, OF PETERSBURG, VIRGINIA.

MONKEY-WRENCH.

SPECIFICATION forming part of Letters Patent No. 675,134, dated May 28, 1901.

Application filed April 3, 1901. Serial No. 54,201. (No model.)

*To all whom it may concern:*

Be it known that I, CHARLES W. MANNOOCH, a citizen of the United States, residing at Petersburg, in the county of Dinwiddie and State of Virginia, have invented a new and useful Monkey-Wrench, of which the following is a specification.

The invention relates to improvements in wrenches.

The objects of the present invention are to improve the construction of wrenches and to provide a simple and comparatively inexpensive one of great strength and durability adapted to have its jaws quickly arranged for engaging a nut or other object and adapted to be readily adjusted to enable it to properly clamp the same.

A further object of the invention is to provide a wrench of this character which will also be adapted to be readily manipulated to quickly disengage it from the nut or other object operated on.

The invention consists in the construction and novel combination and arrangement of parts hereinafter fully described, illustrated in the accompanying drawings, and pointed out in the claims hereto appended.

Figure 1:
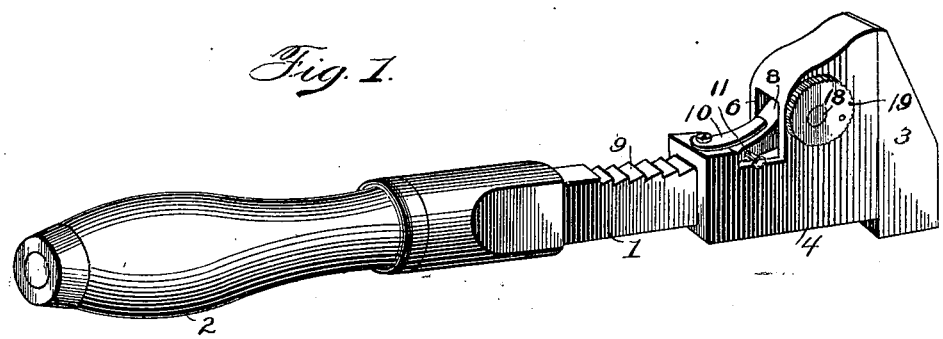
Figure 2:
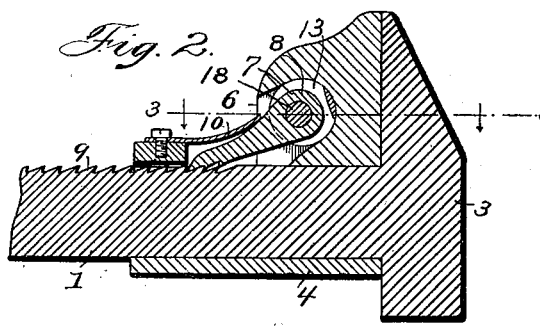
Figure 3:
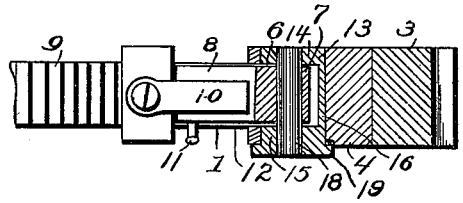
Figure 4:
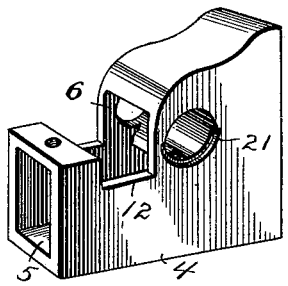
Figure 5:
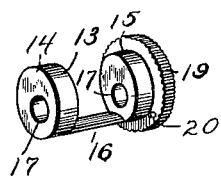

In the drawings, Figure 1 is a perspective view of a wrench constructed in accordance with this invention. Fig. 2 is a longitudinal sectional view of the same. Fig. 3 is a sectional view on the line 3 3 of Fig. 2. Fig. 4 is a detail perspective view of the sliding jaw. Fig. 5 is a similar view of the eccentric.

Like numerals of reference designate corresponding parts in all the figures of the drawings.

1 designates a shank or bar secured at one end to a suitable handle 2 and provided at its other end with a stationary jaw 3, which coöperates with a sliding jaw 4, mounted on the shank or bar and located between the same and the handle, as clearly shown in Fig. 1. The sliding jaw is provided with a longitudinal opening 5 to receive the shank or bar, and its outwardly-extending portion, which lies beyond the shank or bar, is provided at its bottom or inner edge with a recess 6, receiving the outer or pivoted end 7 of a dog 8, which is mounted on and carried by the movable jaw 4 and which is adapted to engage a ratchet 9 of the shank or bar. The ratchet 9 consists of teeth shouldered at the outer side and beveled at the inner side, and the dog is provided at its engaging end with a suitable tooth or engaging portion which is adapted to interlock with the teeth of the shank. The dog is held in engagement with the shank by a spring 10, mounted on the inner portion of the sliding jaw and having its free end bearing against the said dog, as clearly illustrated in Fig. 2 of the drawings. The dog is provided at one side with a pin or projection 11, extending laterally beyond the shank and located at a recess or cut-away portion 12 thereof and adapted to be readily engaged by the operator to swing the dog away from the shank to permit the sliding jaw to move inward on the shank to separate it from the stationary jaw.

In applying the wrench to a nut or other object the movable jaw is first separated from the stationary jaw and after the wrench is placed in position the said movable jaw may be moved up against the nut. This operation may be quickly effected and will be especially advantageous in operating upon leaky joints and the like and will obviate the necessity of the hands of the operator coming in contact with the steam. In order to enable the sliding jaw after this first or approximate adjustment to be accurately positioned, an eccentric 13 is provided. The eccentric 13 consists of circular bearing portions 14 and 15, connected by a cross-piece 16 and provided with alined eccentrically-arranged perforations 17 for the reception of a pivot 18, which passes through the said perforations and through the end 7 of the dog. The circular bearing portions 14 and 15 of the eccentric are arranged in the transverse bearing, opening of the sliding jaw, and they are adapted to be rotated therein to move the pivot inward and outward, and thereby force the sliding jaw tightly against the object to be clamped. The movement effected by the eccentric is preferably a distance substantially three-fourths of the length of one of the teeth of the ratchet of the shank; but this may be varied, if desired. This amount of adjustment, however, will be found amply sufficient to enable the sliding jaw to be lightly clamped against the nut or other object, and if the movement effected by the eccentric is not sufficient to carry the sliding jaw into engagement with the nut when the dog is in engagement with one of the teeth the sliding jaw may be moved backward and the dog engaged with the next tooth, and by this means the necessary reach will be obtained.

The eccentric is provided with a milled head 19, formed integral with the bearing portion 15 and arranged at one side of the sliding jaw and provided at its inner face with a projection 20. The projection 20 extends into a curved groove or recess 21 of the movable jaw, the recess 21 being concentric with the transverse bearing-opening and limiting the rotary movement of the eccentric.

It will be seen that the wrench is exceedingly simple and inexpensive in construction, that it possesses great strength and durability, that the sliding jaw is adapted to move longitudinally of the shank freely to permit an approximate adjustment of the wrench, and that the complete and final adjustment may be quickly effected by the eccentric. It will also be apparent that the wrench may be quickly disengaged from a nut or other object by partially rotating the eccentric or swinging the pawl out of engagement with the shank.

What I claim is—

1. In a wrench, the combination of a shank having a ratchet, a stationary jaw, a sliding jaw mounted on the shank, an eccentric journaled on the sliding jaw and provided with an eccentrically-arranged opening, a pivot passing through the eccentrically-arranged opening, and a dog mounted on the pivot and engaging the said ratchet, substantially as described.

2. In a wrench, the combination of a shank having a ratchet, a stationary jaw, a dog for engaging the ratchet, a movable jaw, an eccentric mounted on the movable jaw and composed of opposite bearing portions spaced apart to receive the dog, and an eccentrically-arranged pivot passing through the bearing portions and through the dog, substantially as described.

3. In a wrench, the combination of a shank having a ratchet, a stationary jaw, a sliding jaw, an eccentric mounted on the sliding jaw and composed of opposite circular bearing portions provided with eccentric perforations arranged in alinement, said eccentric being also provided with an exterior head, a pivot passing through the said perforations, and a dog receiving the pivot and arranged between the said bearing portions, substantially as described.

4. In a wrench, the combination of a shank having a ratchet, a stationary jaw, a sliding jaw mounted on the shank and provided with a recess, an eccentric journaled on the sliding jaw and provided with an eccentrically-arranged perforation, a pivot passing through the perforation, a dog mounted on the pivot and having a lateral projection located at the recess, and a spring engaging the dog, substantially as described.

5. In a wrench, the combination of a shank having a ratchet, a sliding jaw having a transverse bearing-opening and provided with a curved groove, an eccentric arranged in the bearing-opening and having an eccentrically-arranged perforation and provided with a projection fitting in the said groove, a pivot passing through the perforation, and a spring-actuated pawl mounted on the pivot and engaging the ratchet, substantially as described.

In testimony that I claim the foregoing as my own I have hereto affixed my signature in the presence of two witnesses.

CHARLES W. MANNOOCH.

Witnesses:
C. H. MARSHALL,
W. H. BROCKWELL.